May 3, 1932. H. L. PATTERSON ET AL 1,856,966
PIPE DRAWING AND HOLDING DEVICE
Filed Sept. 6, 1929
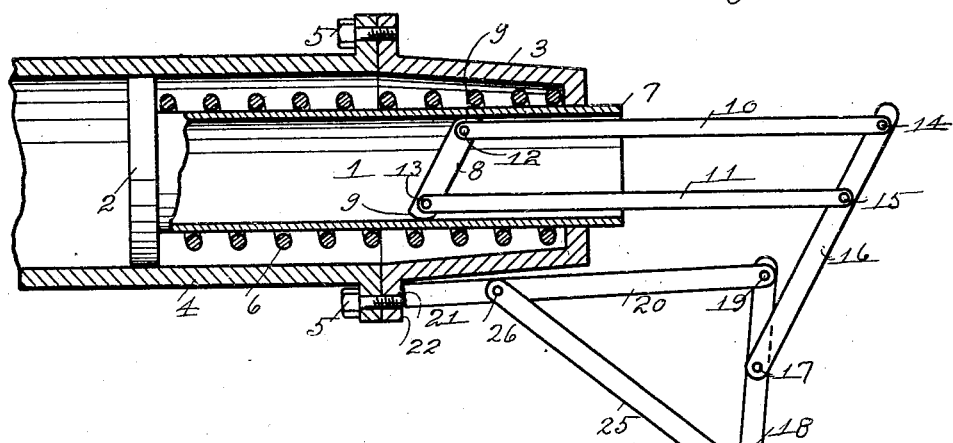
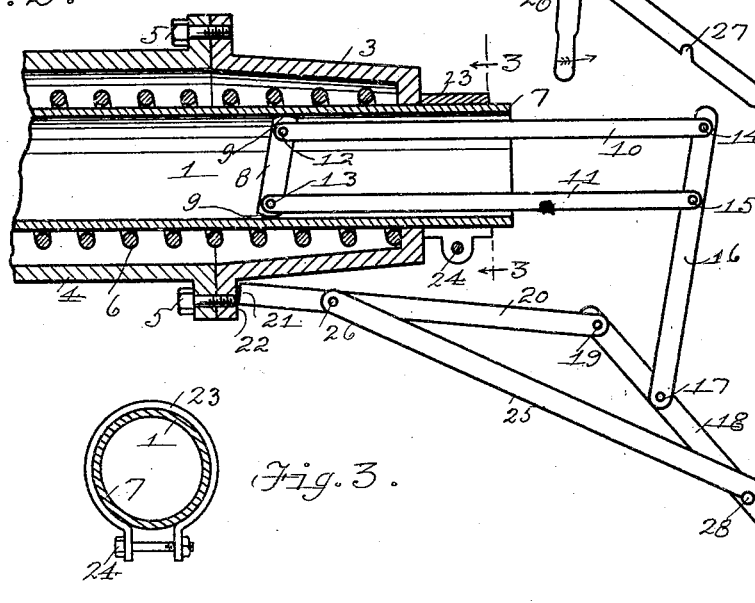
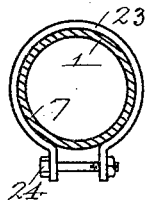
Witness:
Geo. L. Chapel
Inventors:
Harvey L. Patterson
Howard J. Quaife
by Rice and Rice
Attorneys.

Patented May 3, 1932

1,856,966

UNITED STATES PATENT OFFICE

HARVEY L. PATTERSON, OF GRAND RAPIDS, AND HOWARD J. QUAIFE, OF WYOMING TOWNSHIP, KENT COUNTY, MICHIGAN

PIPE DRAWING AND HOLDING DEVICE

Application filed September 6, 1929. Serial No. 390,692.

The present invention relates to devices for drawing pipes or tubular bodies longitudinally and holding the same against longitudinal movement; and its object is to provide an improved device of that character which shall be simple and economical in construction and efficient in operation.

This and any other and more specific objects hereinafter appearing are attained by, and the invention finds preferable embodiment in, the device hereinafter particularly described in the body of this specification and illustrated by the accompanying drawings, in which:

Figure 1 is a side view of a pipe drawing and holding device applied to the tubular piston rod of an air brake cylinder, certain parts being shown in axial section;

Figure 2 is a like view of the same, but showing the parts in another position, and a clamp applied to the outwardly drawn piston rod; and Figure 3 is a transaxial view of the piston rod and an end view of said clamp applied thereto.

Great difficulty is experienced in drawing longitudinally a pipe or tubular body and in holding the same in drawn position, particularly where the pipe must be drawn and held against the pressure of a stiff spring as in the case of an air-brake cylinder's tubular piston rod.

The object of the present invention is to obviate or minimize such difficulty. In the embodiment of the invention illustrated by these drawings, our device is shown applied to the hollow or tubular piston rod 1 of the piston 2 in an air brake cylinder having a head 3 detachably secured to the body portion 4 of the cylinder by the screw bolts 5. This piston is pressed away from said head by a stiff coiled spring 6 surrounding the piston rod. The end 7 of the piston rod sometimes projects outwardly from the cylinder head only a short distance (as seen in Figure 1) so that it is difficult to apply to said projecting end a clamp (such, for instance, as is shown in Figure 3) to hold the piston against the expansive force of said spring while removing the cylinder head and with it the piston from the cylinder for repairs, cleaning, etc. It sometimes happens that on removing the bolts 5 the piston head is suddenly thrown outwardly by the spring 6 thus endangering the workmen employed in this work.

Our device comprises two principal portions, a gripping member, and drawing or holding members. In the illustrated construction the gripping member of the device is an elongated bar 8 longer than the internal width or diameter of the pipe (in this case the tubular piston rod 1), so that said bar may be swung from a position wherein it may be readily inserted into the pipe to a more nearly right angled position relatively to the pipe's axis, thus to cause the ends 9, 9 of this bar 8 to holdingly engage or grip the pipe's internal surface at opposite points. The drawing and holding member or members of the device operate to thus swing the gripping member into its operative position to hold the pipe in its then position, and thereupon to draw the pipe outwardly against the pressure of the spring 6.

These holding and drawing members comprise a pair of parallelly disposed rods 10, 11 whose spaced-apart inner ends are pivotally connected at 12, 13 respectively to the gripping member, these connections 12, 13 being on the opposite sides of (i. e. spaced oppositely and outwardly from) the middle point of the gripping member. The spaced-apart outer ends of these rods are pivotally connected at 14, 15 respectively to the swingable arm 16 adjacent one end thereof, the other end of this arm being pivotally connected at 17 to a lever 18 fulcrumed at 19 on a strut or fulcrum member 20 seated at its other end 21 on the flange 22 of the cylinder head.

The rods 10, 11 being moved toward each other sufficiently, their inner ends and the gripping member 8 carried thereby are thrust into the pipe (the tubular piston rod 1). The fulcrum member 20 being seated on the flange 22, the lever 18 is swung outwardly (in the direction of the arrow) thereby swinging the arm 16 also outwardly. This movement of said arm causes the rods 10, 11 to spread apart, thereby causing the gripping member to swing to a position (seen in Fig. 2) more nearly at right angles to the pipe's axis so that the ends 9, 9 of the gripping member engage and bite into the inner surface of the pipe, these ends being oppositely curved as shown to facilitate this movement.

It will be seen that this movement of the lever 18 and arm 16 first causes the rods 10, 11 to move longitudinally in opposite directions relatively to each other, and then, when the gripping member 8 operatively engages the pipe, draws the same outwardly to such position (as seen in Figure 2) that a split ring clamp 23 shown in Figure 3 may be placed around the pipe 1 and drawn by its screw 24 into clamping relation therewith, the clamp's inner edge abutting on the outer extremity of the cylinder head 3 as shown in Figure 2. The holding and drawing device may now be removed from engagement with the inner surface of the pipe or piston rod, the bolts 5 removed, and the cylinder head 3 and the piston 2 and spring 6 with it removed from the cylinder. An arm 25 pivoted at 26 on the fulcrum member 20 and having a stop notch 27 engaging the lever's projection 28 may be provided to hold the lever in its outwardly swung operative position.

The invention being intended to be pointed out in the claims, is not to be limited to or by details of construction of the particular embodiment thereof illustrated by the drawings or hereinbefore described.

We claim:

1. A device for drawing a pipe longitudinally and holding the same against longitudinal movement, comprising: a gripping member longer than the pipe's internal width and adapted to be swung to a position wherein its ends operatively engage the pipe's internal surface; a pair of rods pivotally connected at their spaced apart inner ends to the gripping member; a fulcrum member; a lever fulcrumed thereon; a link pivotally connected at one end to the lever and adjacent its other end pivotally connected to the spaced apart outer ends of the rods.

2. A device for drawing a pipe longitudinally and holding the same against longitudinal movement, comprising: a gripping member longer than the pipe's internal width and adapted to be swung to a position wherein its ends operatively engage the pipe's internal surface; a pair of rods pivotally connected at their spaced apart inner ends to the gripping member; a fulcrum member; a lever fulcrumed thereon; a link pivotally connected at one end to the lever and adjacent its other end pivotally connected to the spaced apart outer ends of the rods; an arm pivotally connected to the fulcrum member and having a stop adapted to engage the lever to hold the same in its operative position.

In testimony whereof we have hereunto set our hands at Grand Rapids, Michigan, this 30th day of August, 1929.

HARVEY L. PATTERSON.
HOWARD J. QUAIFE.